United States Patent Office 3,362,850
Patented Jan. 9, 1968

3,362,850
PAPER TREATMENT WITH APO AND A POLYCARBOXYLIC ACID
Duane L. Kenaga, Midland, Mich., assignor to The Dow Chemical Company, Midland, Mich., a corporation of Delaware
No Drawing. Filed Apr. 17, 1964, Ser. No. 360,774
6 Claims. (Cl. 117—154)

ABSTRACT OF THE DISCLOSURE

Water repellent products are obtained by impregnating the paper with anhydrous solutions of tris(1-aziridinyl) phosphine oxide, known as APO, and certain polycarboxylic acids, as catalysts, to gain improved strength, wet burst, and wet tensile characteristics in the finished product.

---

This invention relates to an improved method for producing paper products possessing good wet strength and water repellent properties, to compositions useful for this purpose and to products formed thereby. More particularly, the present invention relates to the treatment of paper and paper products with a mixture containing a non-aromatic unsaturated polycarboxylic acid and tris(1-aziridinyl)phosphine oxide.

This(1-aziridinyl)phosphine oxide (APO) is well known as a textile treating agent which imparts flame resistance to textiles and has been suggested as a paper treating agent as disclosed in U.S. Patents 2,891,877, 2,889,289, 2,859,134 and 3,034,919. In such known methods, however, water repellency of the treated textiles is only obtained by incorporating other known sizing reagents into the aqueous mixture containing APO or polymerized APO.

It has now been found that both increased wet strength and water repellency (sizing) is obtained when paper or paper products are treated with mixtures of polyfunctional organic acids and APO in an anhydrous carrier medium followed by curing the impregnated material at elevated temperatures.

The polycarboxylic acids which are employed in the process of the invention are polymers of unsaturated $C_{16}$-$C_{20}$ fatty acids and may be represented by the formula (I)  $R\text{-(COOH)}_n$ wherein $n$ is an integer of from about 2 to 6 (preferably 2 to 4) and R is a hydrocarbon group of from 30 to 114 carbon atoms which is derived from the corresponding unsaturated monocarboxylic fatty acid starting material.

These polycarboxylic fatty acids are prepared according to the following reactions 1 to 10 carbon atoms, each of $R_2$ and $R_4$ is a hydrogen atom or an alkyl group of from 1 to 10 carbon atoms and each of $x$ and $y$ is an integer of from 0 to 10 such that the final polycarboxylic acid product contains from 32 to 120 carbon atoms per molecule. Repetition of the previously-illustrated Diels-Alder reaction produces higher polycarboxylic acids. A preferred class of starting polycarboxylic acids may be obtained by the self-condensation of linoleic acid according to known methods (see U.S. Patent 2,849,399 to Matuszak et al. and U.S. Patent 3,100,784 to Goebel).

According to the process of the present invention, APO, a polycarboxylic acid of Formula I and a suitable anhydrous carrier are combined to prepare an impregnating composition. The untreated paper, cardboard or other paper product is then contacted with the impregnating composition by any conventional method such as dipping, spraying or other known immersion processes. The impregnated material is then cured usually at a temperature of 100° to 190° C. for a time sufficient to effect substantially complete polymerization of the APO and polycarboxylic acid upon the surface of the treated material. Temperatures of from ambient room temperature (about 20° C.) to 200° C. may be used for curing the impregnated paper products. However, at room temperatures, the curing time required is usually from about one week to 30 days, and higher temperatures (120° to 190° C.) are preferred in order to shorten the curing times. The resulting product has excellent water repellent properties in addition to good wet strength characteristics. Neither APO alone nor the polymerized fatty acids alone impart water repellent properties to paper or paper products.

The treating compositions of the invention may contain up to 15 percent by weight of APO based upon the total weight of the composition and the concentration of the polycarboxylic acid may be as high as 20 percent by weight based upon the total weight of the composition.

The weight ratio of APO to polymerized fatty acid may vary from about 100:0.1 to 0.1:100, respectively. Excellent results are obtained when the APO:polymerized fatty acid ratios are from about 20:1 to 1:10. At these ratios, the total concentration of the combined APO-polycarboxylic acid mixture may vary from about .1 to 10 percent by weight based upon the total weight of the treating composition.

The amount of the APO-polycarboxylic acid mixture which is deposited on the material to be treated may vary from .10 percent to 10 percent by weight based upon the dry product prior to treatment. The ratio of APO:polycarboxylic acid is essentially the same in the paper (or other paper product) as it is in the treating solution because only relatively short contact times (up to ½ hour,

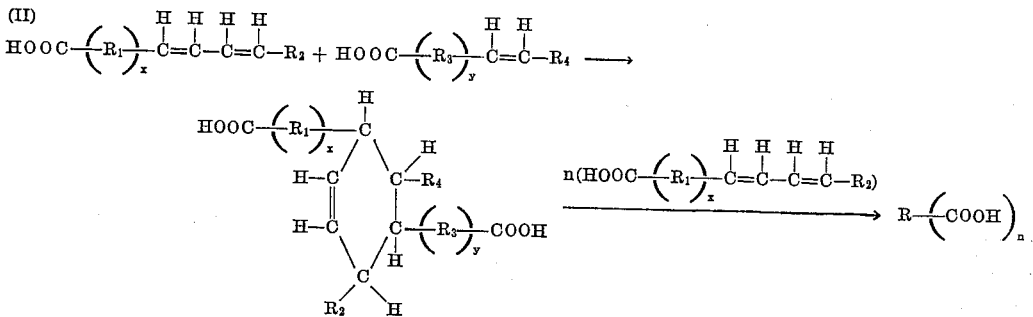

wherein R is a non-aromatic hydrocarbon group of from 30 to 114 carbon atoms with a valence equal to the number of carboxyl groups in the final compounds, $R_1$ and $R_3$ are each divalent alkylene or alkenylene groups of from depending on the size of the material) are used to impregnate the surfaces of the paper. The effects of preferential or selective absorption of the treating agents is therefore minimized.

Any anhydrous solvent which does not react with the APO or the polycarboxylic acid may be used as a carrier in the process of the invention. Suitable solvents include conventional aliphatic hydrocarbon solvents such as hexane, heptane, etc., and aromatic hydrocarbon solvents such as benzene, toluene and xylene. Halogenated solvents such as chlorobenzene, methyl chloroform, carbon tetrachloride, chloroform, ethylene dichloride, ethylene dibromide and perchloroethylene, for example, may also be employed. Other useful solvents include gasoline, kerosene, dioxane, tetrahydrofuran, dimethyl ether, anhydrous methyl alcohol, acetone, methyl ethyl ketone, ethylbenzene and n-pentane.

The use of water in the system is unsatisfactory because the APO-polycarboxylic acid mixture tends to polymerize before it can be deposited on the material to be treated. In addition, the polycarboxylic acids employed are insoluble in water. The system of the invention can be used to treat any type of cellulose-based paper or paper product (including paper board) and is not dependent upon the type of pulp or process used to prepare the paper.

The following examples are submitted for the purpose of illustration only and are not to be construed as limiting the scope of the invention in any way.

*Examples I–XXXIV*

Handsheets of unbleached Abitibi spruce kraft were dipped in 1,1,1-trichloroethane solutions containing various ratios of tris(1-aziridinyl)phosphine oxide and mixtures of polymerized fatty acids. The total amount of solids in the treating solution was maintained at 2 percent by weight based upon the weight of the 1,1,1-trichloroethane. The handsheets were immersed in 100 milliliters of the test solution for one minute. The sheets were then blotted and transferred to a chrome-plated caul. After transfer, the impregnated sheet was placed against a one-half inch felt pad and the total assembly, felt-sheet-caul, was placed on the cold lower platen of a press. The assembly, caul side up, was then raised against the hot upper platen for four minutes at a temperature of 190° C. with minimum pressure. The press was equipped with instruments for the control of temperature and cure times. A thermocouple placed between the sheet and the felt was used when the temperature during the cure cycle was recorded.

The handsheets were conditioned in a constant humidity room (relative humidity of 50 percent at 73° F.) for 48 hours prior to testing. Wet and dry burst, wet and dry tensile and fold tests were run on specimens taken from one 9 x 11 inch handsheet. Size tests were also run (KBB size test). This test measures the time required to establish a flow of a given quantity of electricity through a paper specimen placed between a lower zinc electrode and an upper, water soaked bronze electrode.

Folding endurance is a measure of the strength of the treated paper and is recorded as the total number of folds required to sever the paper at the crease when a uniform folding rate (175 double folds per minute) is used. The test employed in the examples is known as the "MIT Folding Endurance" test and is described under TAPPI (Technical Association for the Pulp and Paper Industry) designation T423 m-50.

The bursting strength of paper is defined as the hydrostatic pressure (in pounds per square inch) required to rupture the material when pressure is applied at a controlled increasing rate through a rubber diaphragm to a circular area of material 1.20 inches in diameter. The test is designated as TAPPI Standard T403 m-53. Both wet and dry burst strength are measured by this method. The wet burst strength is measured using a paper specimen which has been soaked in deionized water for 24 hours at room temperature. Burst factors are calculated to correct for the basis weight of each sheet to the standard TAPPI ream of 70.3 grams per square meter.

The results are summarized in Table 1. The polycarboxylic acids used were mixtures of dimers and trimers of linoleic acid. The composition of each acid mixture used in terms of percentage was as follows:

|  | Percent Monomer C-18 | Percent Dimer C-36 | Percent Trimer C-54 |
| --- | --- | --- | --- |
| Acid composition: |  |  |  |
| A | Trace | 75 | 25 |
| B | 5 | 73 | 22 |
| C | 2-3 | 92-95 | 3-5 |

| Example Number | Acid Composition | Percent Composition of Treating Agents | | Size (Seconds) | Wet Burst Factor (p.s.i.) | Dry Burst Factor (p.s.i.) | Wet Burst / Dry Burst ×100 (Control) |
| --- | --- | --- | --- | --- | --- | --- | --- |
| | | APO | Poly Acid | | | | |
| I (control) | None | 100 | 0 | 3.4 | 40.5 | 83.8 | 59.7 |
| II (control) | do | 0 | 0 | 0.6 | 2.1 | 67.7 | 0.0 |
| III | A | 95 | 5 | 8.0 | 41.4 | 75.3 | 61.1 |
| IV | A | 85 | 15 | 144.4 | 37.7 | 80.7 | 55.6 |
| V | A | 70 | 30 | 138.1 | 38.9 | 75.4 | 57.4 |
| VI | A | 55 | 45 | 138.8 | 38.8 | 83.7 | 57.3 |
| VII | A | 40 | 60 | 143.4 | 28.6 | 77.8 | 42.2 |
| VIII | A | 25 | 75 | 135.6 | 16.7 | 74.9 | 24.7 |
| IX | A | 10 | 90 | 111.8 | 8.8 | 69.7 | 13.0 |
| X | A | 0 | 100 | 15.0 | 4.5 | 65.6 | 6.5 |
| XI | A | 95 | 5 | 8.3 | 42.6 | 83.9 | 62.9 |
| XII | A | 85 | 15 | 114.8 | 40.8 | 79.5 | 60.2 |
| XIII | A | 70 | 30 | 129.9 | 38.1 | 81.7 | 56.3 |
| XIV | A | 55 | 45 | 131.9 | 44.3 | 87.4 | 65.4 |
| XV | A | 40 | 60 | 153.2 | 33.3 | 80.0 | 49.2 |
| XVI | A | 25 | 75 | 131.6 | 20.9 | 71.5 | 30.8 |
| XVII | A | 10 | 90 | 106.7 | 7.8 | 66.6 | 11.5 |
| XVIII | A | 0 | 100 | 8.5 | 5.2 | 65.6 | 7.6 |
| XIX | B | 95 | 5 | 15.0 | 43.3 | 80.4 | 63.9 |
| XX | B | 85 | 15 | 119.5 | 40.3 | 81.1 | 59.5 |
| XXI | B | 70 | 30 | 160.0 | 49.4 | 79.0 | 73.0 |
| XXII | B | 55 | 45 | 141.7 | 42.8 | 80.6 | 63.2 |
| XXIII | B | 40 | 60 | 161.2 | 28.5 | 77.4 | 42.1 |
| XXIV | B | 25 | 75 | 129.7 | 16.9 | 67.0 | 24.9 |
| XXV | B | 10 | 90 | 184.5 | 8.8 | 68.3 | 13.0 |
| XXVI | B | 0 | 100 | 24.5 | 4.6 | 66.6 | 6.7 |
| XXVII | C | 95 | 5 | 20.7 | 47.0 | 78.2 | 69.4 |
| XXVIII | C | 85 | 15 | 162.9 | 41.6 | 81.5 | 61.4 |
| XXIX | C | 70 | 30 | 168.3 | 46.0 | 80.9 | 67.9 |
| XXX | C | 55 | 45 | 210.9 | 41.0 | 79.5 | 60.6 |
| XXXI | C | 40 | 60 | 196.0 | 35.4 | 80.8 | 52.2 |
| XXXII | C | 25 | 75 | 201.6 | 26.7 | 76.6 | 39.3 |
| XXXIII | C | 10 | 90 | 169.3 | 8.7 | 65.6 | 12.8 |
| XXXIV | C | 0 | 100 | 17.5 | 5.6 | 70.5 | 8.2 |

Examples XXXV–XXXVIII

The results summarized in Table 2 were obtained by using a treating method similar to that of the preceding examples, but with varying concentrations of the APO-polycarboxylic acid mixtures (percent based upon the weight of the total solution). A solvent containing 75 percent 1,1,1-trichloroethane and 25 percent by volume of methyl ethyl ketone was used. The curing temperature was held at 190° C. for 4 minutes.

TABLE 2

| Example Number | Concentration of APO in Solution | Concentration of Poly Acid in Total Solution | Acid Composition | Size (Seconds) | Wet Burst Factor (p.s.i.) | Dry Burst Factor (p.s.i.) | Fold |
|---|---|---|---|---|---|---|---|
| XXXV | 1.0 | 0.15 | A | 130.8 | 23.2 | 77.0 | 5.3 |
| XXXVI | 2.0 | 0.30 | A | 160.2 | 33.2 | 75.9 | 29.5 |
| XXXVII | 4.0 | 0.60 | A | 187.6 | 49.1 | 87.3 | 90.4 |
| XXXVIII | 8.0 | 1.20 | A | 366.5 | 28.6 | 85.5 | 45.8 |

Examples XXXIX–XXXXVIII

Using the same type of handsheets as employed in the previous examples, but with curing times of four minutes at temperatures of 120° C. and 190° C., the results summarized in Table 3 were obtained. The acid composition used was Type C.

TABLE 3

| Example Number | Percent Composition of Treating Solution | | Temp. (° C.) | MIT Fold No. | KBB Size (sec.) | Wet Burst Factor (p.s.i.) | Dry Burst Factor (p.s.i.) | Wet Burst / Dry Burst ×100 (Control) |
|---|---|---|---|---|---|---|---|---|
| | APO | Poly Acid "C" | | | | | | |
| XXXIX | Control | Control | | 225 | 0.8 | 2.1 | 69.8 | |
| XXXX | 2.00 | 0.00 | 120 | 349 | 0.4 | 10.6 | 67.3 | 15.1 |
| XXXXI | 1.50 | 0.50 | 120 | 278 | 111.9 | 27.7 | 74.4 | 37.2 |
| XXXXII | 1.00 | 1.00 | 120 | 355 | 157.0 | 34.6 | 83.7 | 41.3 |
| XXXXIII | 2.00 | 0.00 | 190 | 218 | 2.7 | 40.1 | 80.4 | 49.8 |
| XXXXIV | 1.90 | 0.10 | 190 | 353 | 11.8 | 38.0 | 80.6 | 47.1 |
| XXXXV | 1.80 | 0.20 | 190 | 276 | 38.8 | 38.9 | 76.6 | 50.7 |
| XXXXVI | 1.70 | 0.30 | 190 | 335 | 149.9 | 41.1 | 80.0 | 51.3 |
| XXXXVII | 1.50 | 0.50 | 190 | 262 | 194.1 | 43.1 | 77.4 | 55.6 |
| XXXXVIII | 1.00 | 1.00 | 190 | 310 | 583.6 | 47.5 | 78.2 | 60.6 |

I claim as my invention:

1. A method of producing sized cellulosic-based paper materials which comprises:
   (a) contacting said material with a composition containing an inert anhydrous solvent as carrier, and up to about 15 percent by weight of tris(1-aziridinyl) phosphine oxide and up to about 20 percent by weight of a polycarboxylic acid of the formula $R(COOH)_n$ wherein $n$ is an integer of from 2 to 6 and R is an unsaturated hydrocarbon group of from 30 to 114 carbon atoms to form an impregnated material, and
   (b) heating said impregnated material at a temperature of from 100° to 190° C. for a time sufficient to effect a cure.

2. A sized paper product prepared by the method as taught in claim 1.

3. The method of claim 1 wherein the polycarboxylic acid is the thermal dimer of linoleic acid.

4. The method of claim 1 wherein the polycarboxylic acid is the thermal trimer of linoleic acid.

5. A method of producing sized cellulosic-based paper materials which comprises:
   (a) contacting said material with a composition containing an inert anhydrous solvent as carrier, and up to about 15 percent by weight of tris(1-aziridinyl) phosphine oxide and up to about 20 percent by weight of a polycarboxylic acid compound of the formula

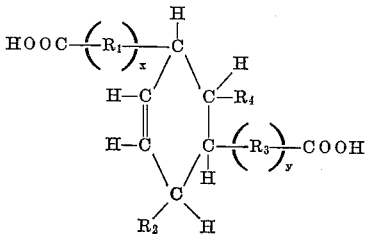

wherein:
   (i) each of $R_1$ and $R_3$ is independently selected from the group consisting of an alkylene and an alkenylene group of from 1 to 10 carbon atoms,
   (ii) each of $R_2$ and $R_4$ is a group of the formula $(C_kH_{2k})H$ wherein $k$ is an integer from 0 to 10, and
   (iii) each of $x$ and $y$ is an integer of from 0 to 10;
   wherein, in said composition, the ratio of tris(1-aziridinyl) phosphine oxide and polycarboxylic acid is from about 20:1 to 1:10, and
   (b) heating said impregnated material at a temperature of from 120° to 190° C. for a time sufficient to effect a cure.

6. A sizing concentrate for paper treatment which comprises a mixture of tris(1-aziridinyl)phosphine oxide and a thermal polymer of linoleic acid containing from 2 to 6 carboxylic groups wherein the ratio of tris(1-aziridinyl) phosphine oxide to thermal polymer is from about 20:1 to 1:10.

References Cited

UNITED STATES PATENTS

| | | | |
|---|---|---|---|
| 2,849,399 | 8/1958 | Matuszak et al. | 252—32.7 |
| 2,859,134 | 11/1958 | Reeves et al. | 117—141 X |
| 2,861,901 | 11/1958 | Reeves et al. | 117—136 |
| 2,889,289 | 6/1959 | Reeves et al. | 260—2 |
| 2,891,877 | 6/1959 | Chance et al. | 117—141 X |
| 2,915,480 | 12/1959 | Reeves et al. | 260—2 |
| 3,034,919 | 5/1962 | Steinhauer | 117—143 X |
| 3,100,784 | 8/1963 | Goebel | 260—18 X |

MURRAY KATZ, *Primary Examiner.*

WILLIAM D. MARTIN, *Examiner.*

M. LUSIGNAN, *Assistant Examiner.*